United States Patent
Donaldson et al.

(10) Patent No.: US 10,889,442 B1
(45) Date of Patent: Jan. 12, 2021

(54) LADDER ROLLER AND TRANSPORT DEVICE

(71) Applicants: Martin Donaldson, McAlester, OK (US); Jarran C. Davis, Tulsa, OK (US)

(72) Inventors: Martin Donaldson, McAlester, OK (US); Jarran C. Davis, Tulsa, OK (US)

(*) Notice: Subject to any disclaimer, the term of this patent is extended or adjusted under 35 U.S.C. 154(b) by 0 days.

(21) Appl. No.: 16/381,157

(22) Filed: Apr. 11, 2019

(51) Int. Cl.
| | |
|---|---|
| *B62B 5/00* | (2006.01) |
| *B62B 3/02* | (2006.01) |
| *E06C 1/397* | (2006.01) |
| *E06C 7/00* | (2006.01) |
| *B65G 7/04* | (2006.01) |
| *E06C 7/42* | (2006.01) |

(52) U.S. Cl.
CPC ............... *B65G 7/04* (2013.01); *E06C 7/00* (2013.01); *B62B 5/0083* (2013.01); *E06C 1/397* (2013.01); *E06C 7/42* (2013.01)

(58) Field of Classification Search
CPC ........... B65G 7/04; B62B 5/00; B62B 5/0083; B62B 5/0093; B62B 1/262; E06C 1/397; E06C 5/00; E06C 7/00; E06C 7/42
See application file for complete search history.

(56) References Cited

U.S. PATENT DOCUMENTS

| | | | | |
|---|---|---|---|---|
| 3,307,291 | A * | 3/1967 | Cremer | A63H 17/262 446/469 |
| 3,612,218 | A * | 10/1971 | Blair | E06C 1/397 182/127 |
| 4,049,283 | A * | 9/1977 | Brookes | B62B 5/0083 280/47.131 |
| 6,708,993 | B2 * | 3/2004 | Feik | B62B 5/0083 280/63 |
| 8,540,294 | B2 | 9/2013 | Dowler | |
| 8,851,234 | B2 | 10/2014 | Bachorski | |
| D833,034 | S | 11/2018 | Davis | |
| D833,035 | S | 11/2018 | Davis | |
| 2005/0034923 | A1 * | 2/2005 | Feik | E06C 1/397 182/127 |
| 2013/0009414 | A1 * | 1/2013 | LeClaire | A45F 5/10 294/151 |

* cited by examiner

*Primary Examiner* — Tan Le
(74) *Attorney, Agent, or Firm* — Chad Hinrichs

(57) ABSTRACT

A ladder transport device for use with a detachable ladder handle. The transport device has an axle and pair of wheels which are mounted on a body. The axle and wheels are rotatable and axially moveable relative to the body. The transport device body is securable to the detachable handle. The detachable handle is securable to the exterior side of a ladder near the end of the ladder. The user can then roll the ladder on the wheels by lifting and pulling on the opposite end of the ladder. Stability is improved by horizontally aligning the cross sectional center of gravity of the ladder between the wheels.

8 Claims, 5 Drawing Sheets

LADDER ROLLER AND TRANSPORT DEVICE

FIELD OF THE INVENTION

The present invention relates generally to a device to move a ladder. More particularly, the present invention relates to a device to secure wheels to a detachable ladder handle.

BACKGROUND OF THE INVENTION

Moving a ladder can be a cumbersome and awkward task. Using longer and industrial strength ladders adds to the weight of the ladder and makes is more difficult to maneuver. The task of moving a ladder becomes even more burdensome when it must be moved from job to job in a large facility such as a hospital, school or corporate campus or from a service truck to a remote site.

Detachable ladder handles, such as those in U.S. design Pat. D833,034 and D833,035 (the Davis Patents), have been developed to assist individuals in moving ladders. They provide a way to easily grip and lift the ladder whether it is a folding ladder or extension ladder. However, the user must still lift and carry the weight of the ladder, which can be a strenuous activity.

What is needed, therefore, is a way for an individual to move a ladder without bearing the entire way of the ladder.

Further what is needed is for the device to not impact the operation and function of the ladder.

BRIEF SUMMARY OF THE INVENTION

The present invention achieves its objections by providing a ladder transport device which allows the user to attach wheels to the ladder for moving it. The ladder transport device is to be used in conjunction with a detachable ladder handle such as those disclosed in the Davis Patents. These handles are available commercially. The ladder handle is attached to the exterior side of the ladder near one of the ends. The ladder transport device is secured to the handle. The user can then lift the opposite end of the ladder and pull it. The ladder will then roll on the wheels of the transport device.

In one embodiment the wheels are mounted on an axle which is longer than the length of the body of the transport device. This allows the wheels and axle to rotate and move axially relative to the body of the transport device. Aligning the cross sectional center of gravity of the ladder horizontally between the wheels will prevent the ladder from rotating to one side as it is being pulled. The transport device and detachable handle can be left in place or quickly removed when the ladder is in use.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT

Figure 1:
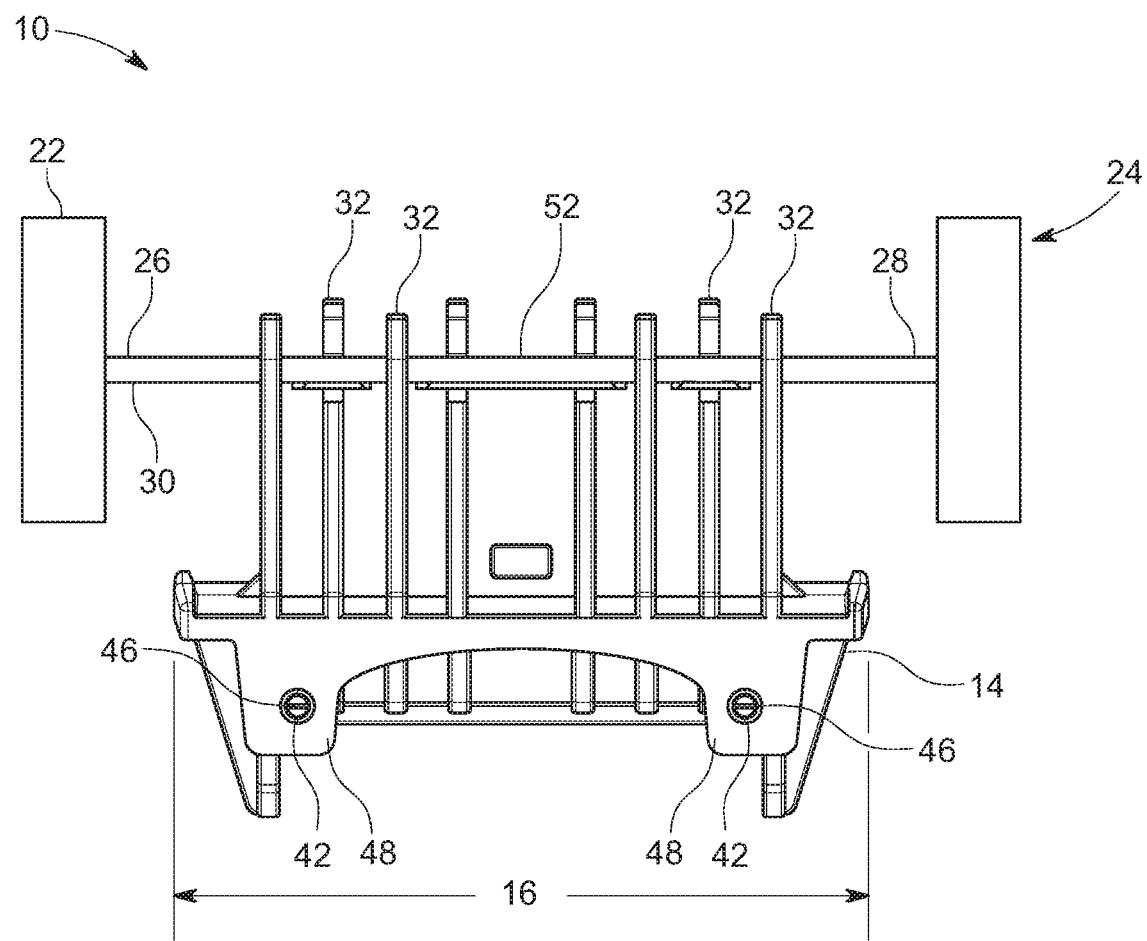
FIG. 1 is a front view of the preferred embodiment of the ladder transport device of the present invention.
Figure 2:
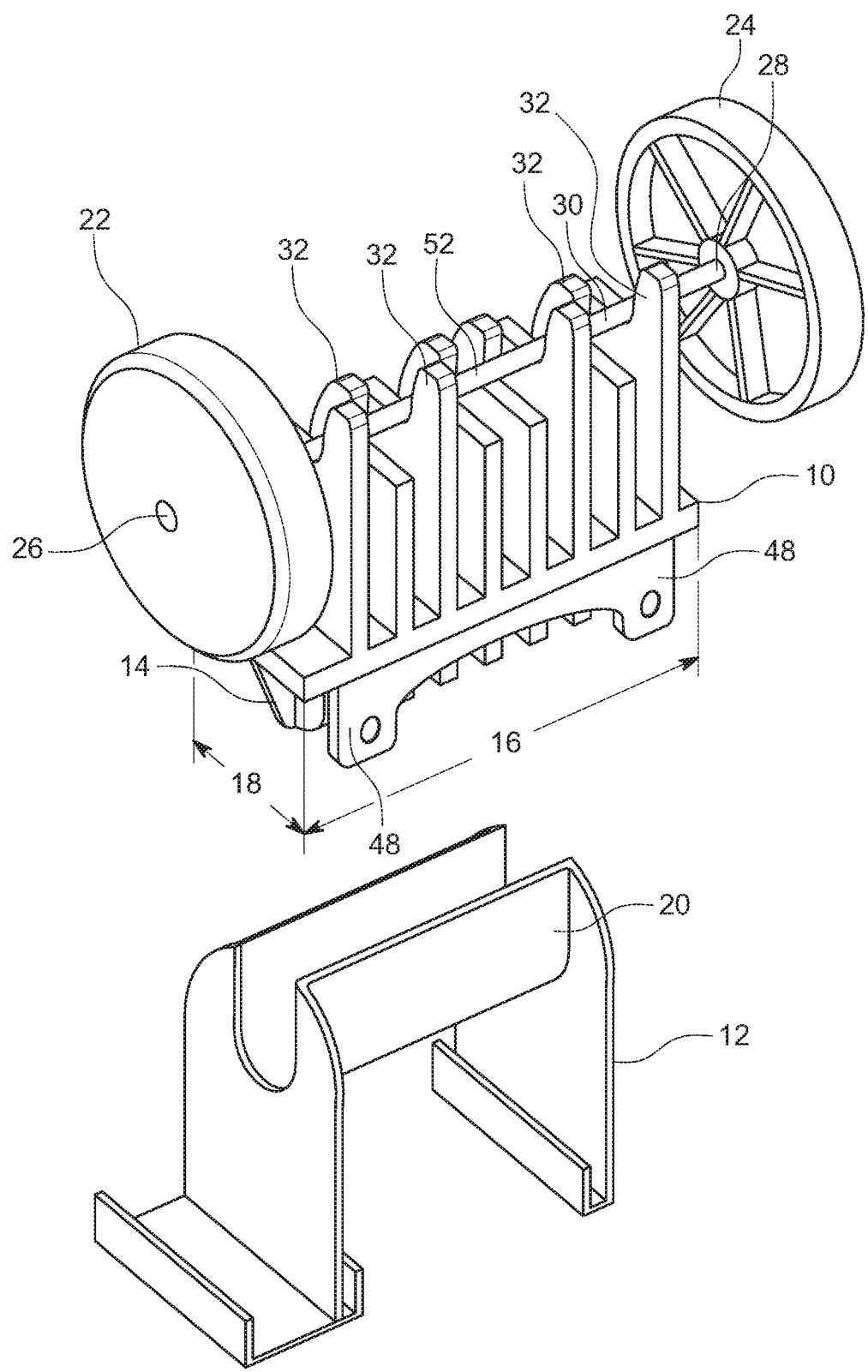
FIG. 2 is prospective view of the ladder transport device and a detachable ladder handle.

Turning now to the drawings wherein like reference characters indicate like or similar parts throughout, FIG. 1 illustrates a ladder transport device 10 for use with a detachable handle 12. FIGS. 2-5 show the ladder transport device 10 in use with a detachable ladder handle 12.

The ladder transports device 10 has a body 14 which is securable to a ladder handle 12. The body 14 has a length 16 and a width 18 such that at least a portion of the body 14 can fit inside a cross member 20 of the detachable handle 12. There is a first and second wheels 22 and 24 mounted on the body 14 and rotatable relative to the body 14. In the preferred embodiment the pair of wheels 22 and 24 are mounted on the first and second end 26 and 28 of an axle 30.

The axle 30 passes through a portion of the body 14 and is free to rotate relative to the body 14. In the embodiment shown in FIGS. 1-5, the body 14 has a plurality of rib structures 32 which extend from the body 14. The axle 30 is captured between the rib structures 32 such that the axle 30 and wheels 22 and 24 are free to rotate relative to the body 14.

To use the present invention, the ladder transport device 10 is secured to a detachable handle 12. In the preferred embodiment the body 14 of the ladder transport device 10, or a portion of the body 14, is placed inside a crossmember 20 of the detachable handle 12. The detachable handle 12 must be secured to the ladder 34 on the side 36 adjacent to an end 38 of the ladder 34. The transport device 10 may be secured to the detachable handle 12 either before or after the detachable handle 12 is secured to the ladder 34. Once in place, the user 40 then lifts the end of the ladder 34 opposite the ladder transport device 10. The user 40 can then pull the ladder 34 behind them as they walk.

Figure 4:
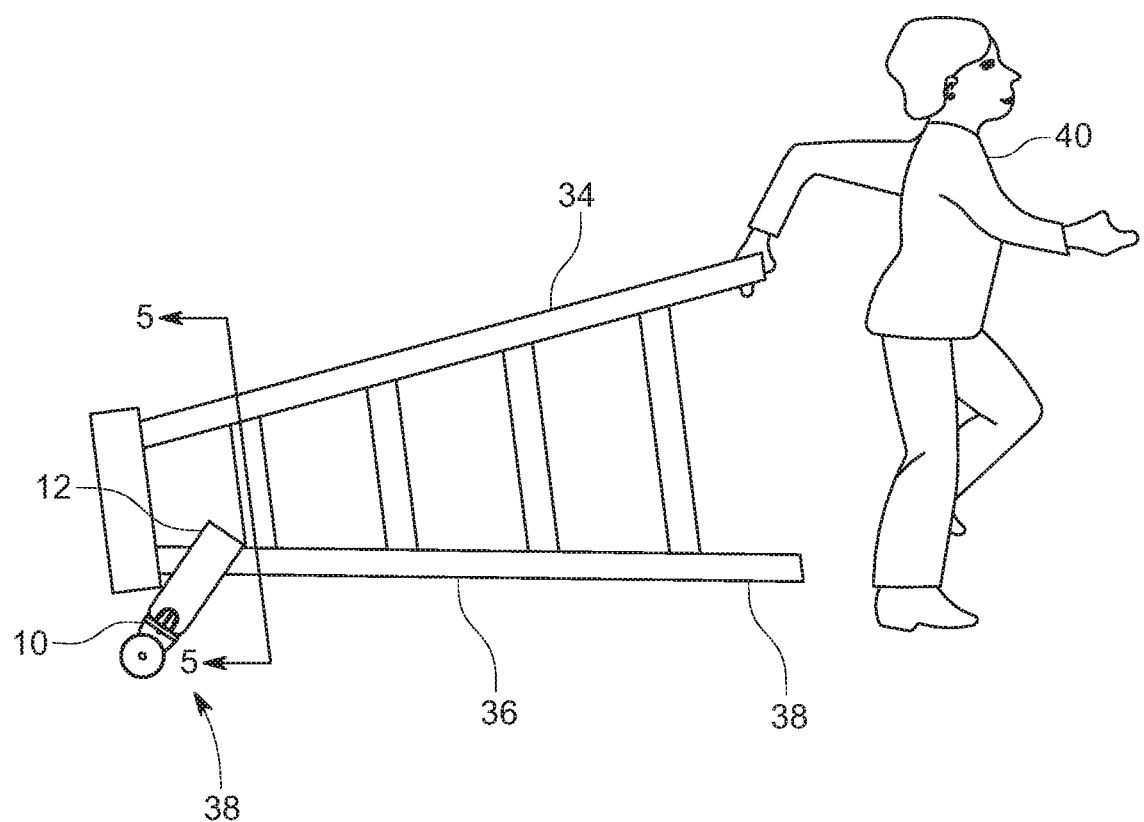
FIG. 4 is side view of the ladder transport device secured to a detachable ladder handle and in use moving a step ladder.

While FIG. 4 shows the ladder transport device 10 attached to the top end 38 of a step ladder 34, the present invention 10 will also work if attached to the bottom end 38 of the ladder 34. Further, the present invention may be used any type of ladder 34 that the detachable handle 12 can attach, including but not limited to folding ladders, extension ladders and straight ladders.

The transport device 10 may be secured to the detachable handle 12 by an interference fit between the body 14 of the device 10 and the crossmember 20 of the detachable handle 12. Additional means of securing the two parts may be preferred. If so, a fastener 42 may be used. One embodiment of the fastener 42 is a zip tie 44 extending around the crossmember 20 of the detachable handle 12 and the body 14 or a portion of the body 14 of the transport device 10.

Figure 3:
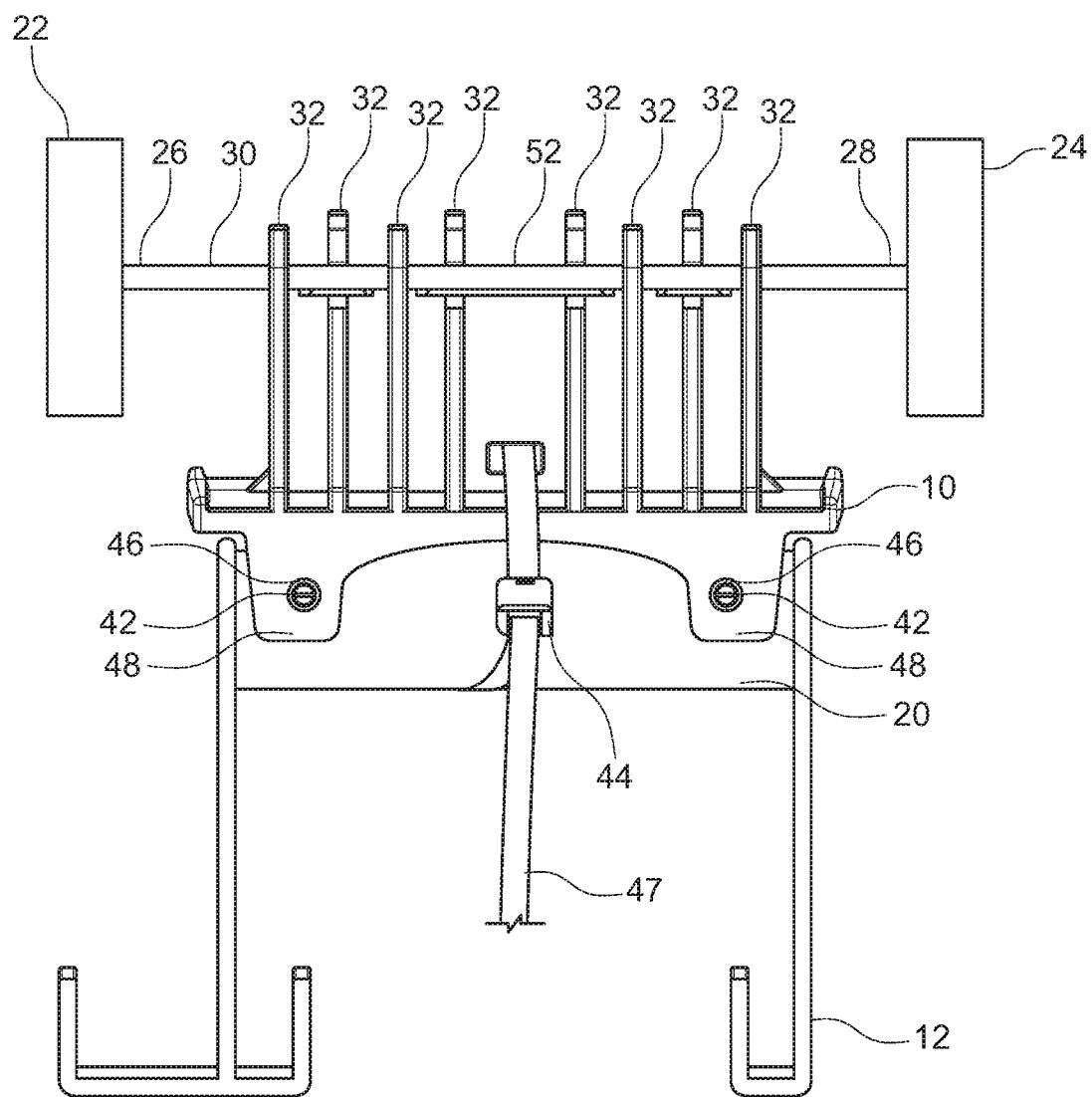
FIG. 3 is front view of the ladder transport device secured to a detachable ladder handle.

Another embodiment of the fastener 42 is one or more screws 46 passing through a portion of the body 14 of the transport device 10 and a portion of the crossmember 20 of the detachable handle 12. As best seen in FIG. 3, the body 14 is provided with one or more tabs 48 which extend from the body 14 and over the exterior of the crossmember 20. The screw 46 passes through the tab 48 and into the underlying crossmember 20. These tabs 48 may be located on either side of the body 14 with one or more screws 46 located on each side of the body 14.

Figure 5:
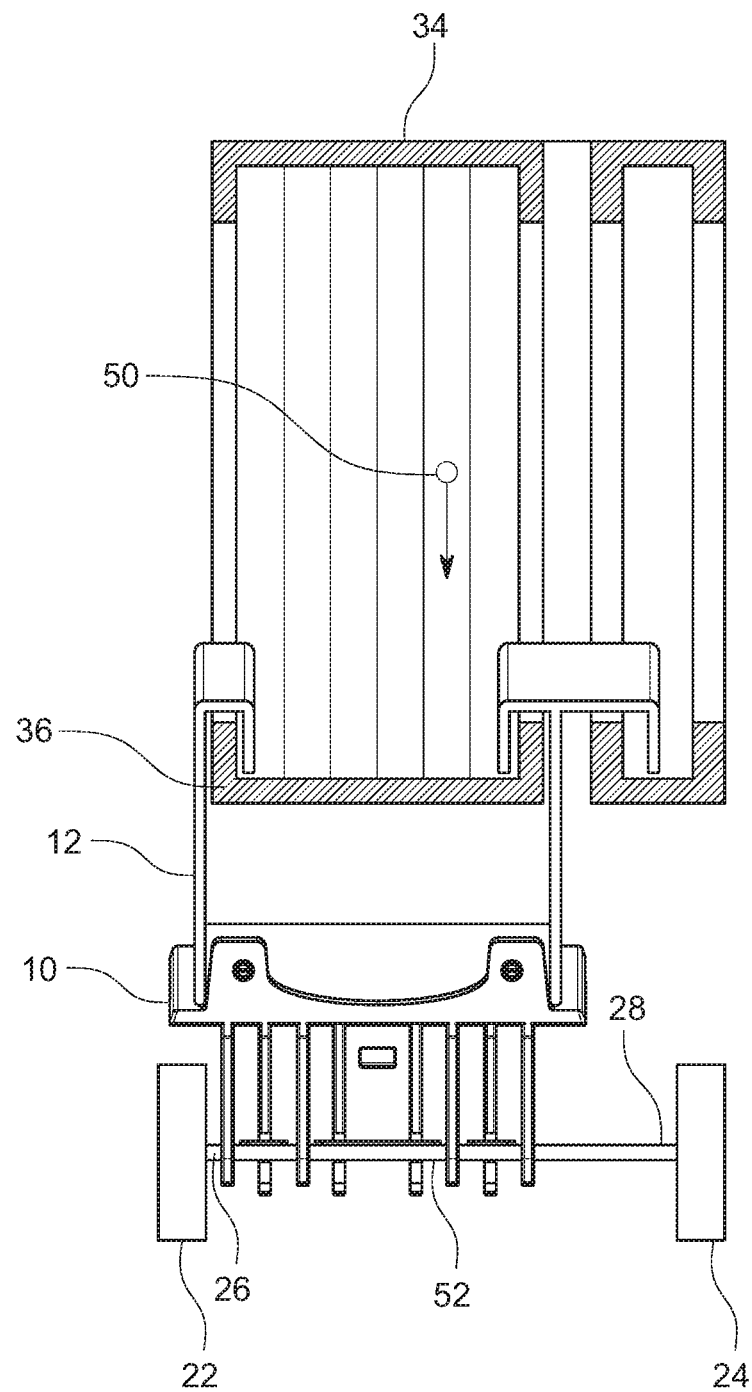
FIG. 5 is cross section view of a step ladder with a detachable ladder handle attached to the ladder and a ladder transport device secured to the detachable ladder handle.

In one embodiment of the present invention the axle 30 is longer than length 16 of the body 24 of the transport device 10. This allows the axle 30 and wheels 22 and 24 to move axially relative to the body 14 as well as rotate. When using this embodiment of the device 10 it is preferred to position the axle 30 such that the cross sectional center of gravity 50 of the ladder 34 is located horizontally between the first and second wheel 22 and 24. This is illustrated in FIG. 5. This prevents the ladder 34 from tipping to one side as it rolls on the wheels 22 and 24. Stability can be further increased if the cross sectional center of gravity 50 of the ladder 34 is aligned horizontally over the center point 52 of the axle 30, as shown in FIG. 5. The user 40 can also resist a sideways tipping of the ladder 34 by applying a counteracting force to the end 38 of the ladder 34 that is held by the user 40.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A ladder transport device for moving a ladder, said devise comprising:
    a ladder handle having a hollow crossmember and being capable of being detachably mounted on a ladder;
    a body removably securable to the ladder handle, the body having a length and a width;
    a pair of wheels secured to the body and rotatable relative to the body;
    an axle;
    a first wheel of the pair of wheels mounted on a first end of the axle;
    a second wheel of the pair of wheels mounted on a second end of the axle; and
    a plurality of rib structures extending from the body;
    wherein a portion of the body of the transport device is captured within the hollow crossmember of the detachable ladder handle and the axle is captured between the rib structures and the axle is capable of rotating.

2. The device of claim 1 further comprising:
    the axle having a length greater than the length of the body, wherein the axle is adjustable axially relative to the rib structure.
3. The device of claim 2 further comprising:
    the axle being adjusted such that a cross sectional center of gravity of the ladder is aligned horizontally between the first and second wheels.
4. The device of claim 2 further comprising:
    the axle being adjusted such that a cross sectional center of gravity of the ladder is aligned horizontally with a center-point between the first and second wheels.
5. The device of claim 1 further comprising:
    the body being secured to the handle by one or more fasteners.
6. The device of claim 5 the one or more fasteners comprising:
    a screw passing through a portion of the crossmember of the detachable handle and a tab on the body.
7. The device of claim 5 the one or more fasteners comprising:
    a zip-tie encircling the crossmember of the detachable handle and a portion of the body.
8. A ladder transport device for use with a detachable ladder handle in transporting a ladder, said devise comprising:
    a ladder handle having a hollow crossmember and being capable of being detachably mounted on a ladder;
    a body removably securable to the ladder handle, the body having a length and a width; and
    a pair of wheels secured to the body and rotatable relative to the body;
    an axle with a length greater than the length of the body;
    a first wheel of the pair of wheels mounted on a first end of the axle;
    a second wheel of the pair of wheels mounted on a second end of the axle; and
    a plurality of rib structures extending from the body;
    wherein the axle is captured between the rib structures and the axle is capable of rotating and moving axially relative to the rib structures
    the axle being adjusted such that a cross sectional center of gravity is aligned horizontally between the first and second wheels and
    wherein a portion of the body of the transport device is captured within the hollow crossmember of the detachable ladder handle.

* * * * *